May 4, 1926.

J. P. ASHLEY ET AL

ROLLING MILL AND LIKE COUPLING

Filed Feb. 16, 1925

1,582,890

Inventors
J. P. Ashley
L. D. Whitehead
By Marks Clerk
Attys.

Patented May 4, 1926.

1,582,890

UNITED STATES PATENT OFFICE.

JAMES PINK ASHLEY AND LIONEL DIGBY WHITEHEAD, OF NEWPORT, ENGLAND.

ROLLING-MILL AND LIKE COUPLING.

Application filed February 16, 1925. Serial No. 9,665.

*To all whom it may concern:*

Be it known that we, JAMES PINK ASHLEY and LIONEL DIGBY WHITEHEAD, British subjects, both residing at Courtybella Works, Newport, in the county of Monmouth, England, have invented certain new and useful Improvements Relating to Rolling-Mill and like Couplings, of which the following is a specification.

This invention relates to rolling mill and like couplings, and particularly to those commonly known as wobbler couplings, in which a muff or sleeve is adapted to be slipped over and to effect a driving connection between the adjacent corrugated or polygonal ends of a pair of rotary parts, such as a driving shaft or pinion and a roll. A common means for preventing endwise displacement is to bind stretcher or distance pieces around the shaft between a pair of couplings or alongside a single coupling to act as an end abutment for the couplings or coupling. This device is well known to be dangerous.

The object of the invention is to provide improved means for preventing endwise displacement of such couplings.

The invention comprises the provision in conjunction with a coupling, of means which enter the space between the adjacent ends of the parts to be connected. In particular the invention comprises the insertion through the coupling of a bolt or cotter.

In the accompanying sheet of explanatory drawings:—

Figure 1:
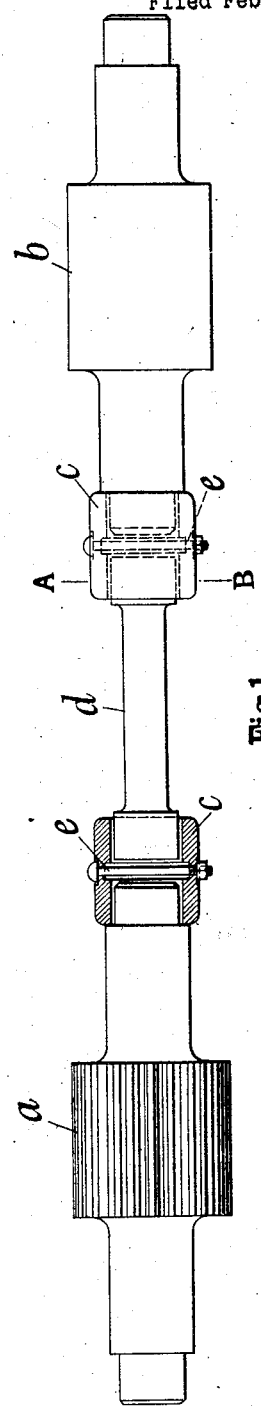
Figure 2:
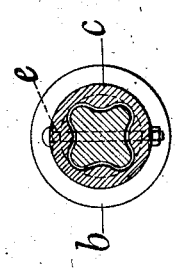

Figure 1 is a side elevation, and Figure 2 a cross section taken on the line A—B of Fig. 1 showing a roll driving shaft and couplings provided with this invention.

In the application of the invention as shown the driving pinion *a* and roll *b* are connected by a pair of wobbler couplings *c* and an intermediate shaft *d*. Each coupling has a hole formed diametrically through it, and after the coupling has been placed in position a bolt *e* (preferably of square section) or a cotter is inserted into the hole and through the space between the adjacent ends of the parts within the coupling. When a bolt is used a spring washer is placed beneath its head or the nut to prevent detachment by vibration or mechanical shock. If desired the head and nut may occupy recesses in the outer surfaces of the couplings. When a cotter is used, it may be of the split variety or solid.

Any other device which by interaction with the adjacent ends of the connected parts serves to prevent endwise movement of the coupling may be employed.

By this invention several important advantages are obtained in a very simple and inexpensive manner. For example, the coupling is effectually held in position as it cannot move endwise relatively to the parts which it engages. The coupling can be applied and removed readily. The fastening means are more reliable and durable than those commonly used. Further the fastening interferes in no way with the freedom of the coupling to accommodate itself to small relative axial or angular movements of the connected parts. And by properly holding the coupling in position, loss of power due to stresses which would be set up if the coupling slipped from its correct position, is avoided. Also additional safety is obtained in that the ordinary necessity for any additional means fastened on, for example, the spindle *d* for preventing endwise movement of the coupling, and the consequent risk to operatives working near the coupling, is obviated.

Having thus described our invention what we claim as new and desire to secure by Letters Patent is:—

1. In rolling mill and like couplings, the combination with a coupling embracing a pair of parts to be connected, of an element removably arranged transversely through the coupling and insertable at a point externally of the coupling and positioned between the adjacent ends of the parts within the coupling for preventing endwise displacement of the coupling and for preventing excessive longitudinal movement of the parts connected by the coupling, substantially as described.

2. In rolling mill and like couplings, the combination of driving and driven shaft members, of an intermediate shaft of a length slightly less than the space between the driving and driven shaft members, sleeve like couplings slidably and non-rotatably connected with the adjacent ends of the shaft members and the intermediate shaft and bolts removably insertable externally of the sleeve like couplings and passing between the adjacent ends of the shaft members and the intermediate shaft for preventing excessive longitudinal movement of the intermediate shaft and for preventing longitudinal displacement of the sleeve like couplings, substantially as and for the purposes set forth.

In testimony whereof we have signed our names to this specification.

JAMES PINK ASHLEY.
LIONEL DIGBY WHITEHEAD.